United States Patent
Olsson et al.

(10) Patent No.: US 6,564,748 B1
(45) Date of Patent: May 20, 2003

(54) REEF RACK SYSTEM FOR AQUARIUMS

(76) Inventors: Karl D. Olsson, 1317 Beryl St. #D, Redondo Beach, CA (US) 90277; Peter E. Reese, 2008 Perkins La., Redondo Beach, CA (US) 90278

( * ) Notice: Subject to any disclaimer, the term of this patent is extended or adjusted under 35 U.S.C. 154(b) by 243 days.

(21) Appl. No.: 09/664,628

(22) Filed: Sep. 19, 2000

Related U.S. Application Data

(60) Provisional application No. 60/154,816, filed on Sep. 20, 1999.

(51) Int. Cl.[7] ............................................. A61C 63/00
(52) U.S. Cl. .................................................... 119/269
(58) Field of Search ................................. 446/476, 477, 446/478, 479, 480, 481, 482, 105, 106, 107, 108, 114–122, 124, 125, 128; 119/269, 256, 247, 248, 251, 253

(56) References Cited

U.S. PATENT DOCUMENTS

| | | | |
|---|---|---|---|
| 3,330,582 A | * 7/1967 | Morris | |
| 4,993,362 A | 2/1991 | Jimbo | |
| 5,073,138 A | * 12/1991 | Klitsner et al. | 446/103 |
| 5,681,201 A | * 10/1997 | Choi | 446/105 |
| 5,690,053 A | 11/1997 | Strange | |
| 5,722,347 A | * 3/1998 | Tominaga et al. | 119/253 |
| 5,951,356 A | * 9/1999 | Cyrus et al. | 446/118 |
| 6,296,541 B1 | * 10/2001 | Bezalel et al. | 446/105 |

* cited by examiner

Primary Examiner—Thomas Price
(74) Attorney, Agent, or Firm—Lee W. Tower

(57) ABSTRACT

A reef rack system for aquariums is provided, which includes a ledge supported by first and second removably attached posts having first and second lengths, respectively. The posts each include a first channel having a first width extending along the length of the post on a first side of the post and a second channel having the first width extending along the length of the post on a second side of the post opposite to the first side of the post. The posts also have a first plurality of protruding ridges along the length of the post on a third side of the post between the first and second channels and a second plurality of protruding ridges extending along the length of the post on a fourth side of the post between the first and second channels, the fourth side of the post being opposite to the third side of the post. The ledge includes a frame, a first attachment frame attached to the frame, and a second attachment frame. The attachment frames have an opening adapted to slide over and removably attach to the first and second plurality of protruding ridges of a post. The first and second attachment frames are removably attached to the first and second posts, respectively. Feet are adapted to be attached to either end of the posts. A post lock is provided to extend the length of a post by locking an end of one post to the end of another post.

20 Claims, 5 Drawing Sheets

REEF RACK SYSTEM FOR AQUARIUMS

This application claims benefit of provisional application 60/154,816, filed Sep. 20, 1999.

BACKGROUND OF THE INVENTION

1. Field of the Invention

This invention relates generally to systems for arranging materials for a reef, such as rocks, plants and coral, in an aquarium in a variety of shapes. The resulting marine reef or freshwater bioscape beautifies an aquarium while hiding fixtures and other apparatus necessary for operation.

2. Description of the Related Art

A successful reef tank environment requires unrestricted water flow throughout the tank to ensure adequate circulation to all portions of the reef and the organisms contained therein. The most common methods of constructing reefs typically result in poor circulation and inefficient use of landscaping materials. Stacking live rock to gain vertical height for the reef results in a large volume of rock in the interior of the base that receives little or no circulation. With the moderate to high cost of quality live rock, this method is highly inefficient for the hobbyist and contributes no benefit to the aquarium environment.

In addition, the stacked rock construction method makes it difficult to perform maintenance in the aquarium. In order to clean behind this type of reef, large sections of the reef must be dismantled and reconstructed. Without a structure to support the remainder of the reef wall, it is often difficult to reassemble the reef in the original shape. Also, without the support structure, the reef is subject to shifting and collapse during maintenance operations or due to the ongoing actions of snails and other natural factors.

A number of alternatives to stacking live rock have been developed, with varying degrees of effectiveness. Creating a base out of other less expensive materials, such as bricks in small aquariums or cinder blocks in large tanks, helps to improve the economic efficiency but results in the same reduced circulation.

One approach based on concrete pieces (Jimbo, U.S. Pat. No. 4,993,362) uses plates stacked on supporting poles. This system provides an improvement in the vertical slope of the reef, but does not allow circulation between the plates.

Several prior art systems are based on an eggcrate material (Frank Strange, Jr., U.S. Pat. No. 5,690,053; Mike Bender, MARINE FISH MONTHLY, February 1996; Mathew Stevens, AQUARIUM, September 1996) which provides water flow through the openings of the material. These systems utilize a combination of the eggcrate material and P.V.C. pipe or plastic tubing to form a series of surfaces on which the reef can be built. However, all of these approaches involve cutting the eggcrate material to obtain the desired shape and bonding the pieces together using adhesive. This requires skill in the construction of the system to avoid damaging and thereby wasting the materials, and makes these systems inflexible in terms of changing the configuration of the reef. Once the system has been cut and bonded to form a particular shape, it cannot be easily disassembled or altered.

What is needed is a reef rack system that solves all of these problems by allowing construction of the reef support system without the use of any tools or adhesives. It would be best to have all the pieces of the system slide together to provide a solid, secure structure for the subject reef. This would allow the user to reconfigure any portion of the system without disturbing the other sections of the structure. The system should also be modular to permit expansion of the structure in any direction to easily create a reef that conforms to the shape of the aquarium. The vertical reef face achievable with the system should maximize the space available in small aquariums and minimize the amount of live rock required to create a particular reef shape. An open space should be maintained between the rear of the reef wall and the back of the tank. The open space is crucial to proper circulation throughout the aquarium, to provide easy access for cleaning and maintenance, and to provide a space for tank equipment behind the reef so that the tank equipment is hidden from view.

SUMMARY OF THE INVENTION

According to the invention, a reef rack system for aquariums is provided, which includes a ledge supported by first and second removably attached posts having first and second lengths, respectively. The posts each include a first channel having a first width extending along the length of the post on a first side of the post and a second channel having the first width extending along the length of the post on a second side of the post opposite to the first side of the post. The posts also have a first plurality of protruding ridges along the length of the post on a third side of the post between the first and second channels and a second plurality of protruding ridges extending along the length of the post on a fourth side of the post between the first and second channels, the fourth side of the post being opposite to the third side of the post. The ledge includes a frame, a first attachment frame attached to the frame, and a second attachment frame. The attachment frames have an opening adapted to slide over and removably attach to the first and second plurality of protruding ridges of a post. The first and second attachment frames are removably attached to the first and second posts, respectively.

The reef rack system includes feet, which can be attached to the ends of the posts and used to keep the system from tipping over. The feet can also be used to support the top of posts against the side of an aquarium. A foot includes a base, and a foot attachment attached to the base. The foot attachment has a third length normal to the base and adapted to grip the first post between a first portion of the foot attachment that is adapted to mate to the first plurality of protruding ridges, a second portion of the foot attachment that extends into the first channel, and a third portion of the foot attachment that extends into the second channel. The first portion that extends into the first channel has a second width that is less than half of the first width of the first channel, and similarly, the second portion that extends into the second channel has a second width that is less than half of the first width of the second channel.

The length of posts can be extended by using a post lock, which can be used to removably join a third post to the first post. The third post is constructed in the same manner as other posts. Each of the posts has a notch cut between the first and second channels at one end of the post. The notch is cut to have a third width narrower than the first width.

The post lock is adapted for extending the first length of the first post by removably joining the first post to the third post by inserting the post lock into the notches on the ends of the first and third posts. The post lock has a first rail extending along the its length and has a fourth width adapted for sliding between the first width of the first channels on the first and third posts. A second rail extends along the post lock length and has a fourth width adapted for sliding between the first width of the second channels on the first and third posts. A bar connects and separates the first and second rails, the bar having a width adapted so that the first and second rails fit snuggly into the first and second channels on the posts and the bar having a first depth adapted for sliding snuggly into the third width of the notch.

Other objects and many of the attendant features of this invention will be more readily appreciated as the same becomes better understood by reference to the following detailed descriptions and considered in connection with the accompanying drawings in which like reference symbols designate like parts throughout the figures.

DETAILED DESCRIPTION

Figure 1:
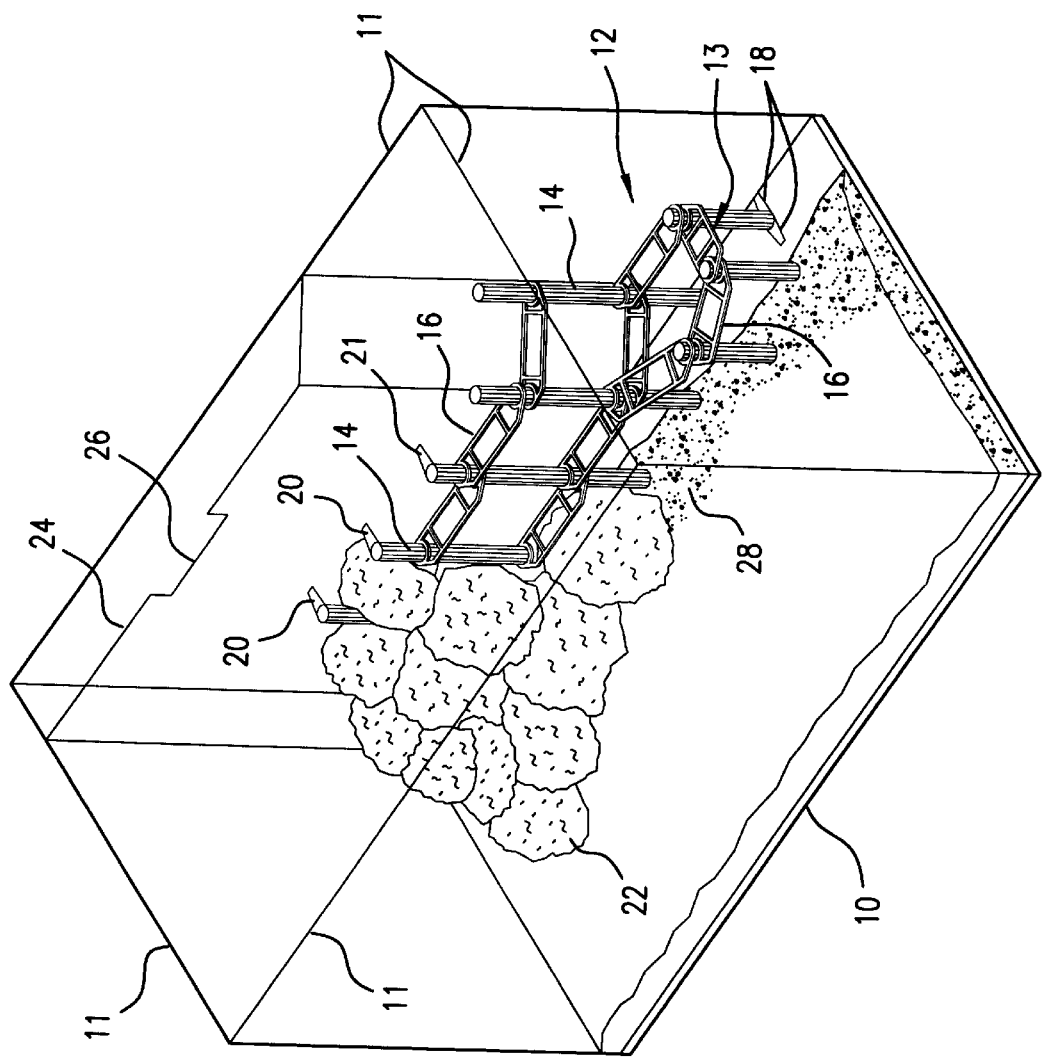
FIG. 1 is a perspective view of the reef rack system supporting a reef in an aquarium in accordance with the present invention.

Referring now to the drawings, and more particularly, to FIG. 1, there is shown a perspective view of the reef rack system 12 supporting a reef in an aquarium 10. The aquarium 10 has surroundings transparent walls 11 and can be equipped with features such as an overflow for the tank such a shown by wall 24 and overflow channel 26. The reef rack system 12 has posts 14 that rest on the bottom of the aquarium and support a number of ledges 16. To stabilize posts 14, feet 18 are removably mounted on the bottom of the posts. Further to stabilize the top of the reef rack system with respect to the sides of the aquarium, feet 20 are removably mounted on the top of the posts so that the end of a foot 21 is against a side of the aquarium. The result is a stable reef rack system that can support rock and other reef material.

The reef support system 12 can be assembled without the use of any tools or adhesives. All the pieces of the system are removably connected together to provide a solid, secure structure for the reef. Since the ledges 16 can be mounted at various heights and orientations on the posts 14, the reef rack system 12 can be built in various configurations. The placement of feet 18 on the bottom of the posts or feet 20 on the top of the posts 14 is also flexible to account for different aquarium configurations. The reef rack system 12 is modular and expandable in any direction to easily create a reef that conforms to the shape of the aquarium. As shown in FIG. 1, the reef rack system 12 can expand vertically and in depth. For example, section 13 shows a horizontally parallel section of the reef rack system. As is explained below, the reef rack system is not limited in height to the height of a post, because a means is provided for coupling posts to obtain the sum of the height of the two or more coupled posts. The vertical reef face achievable with the reef rack system 12 maximizes the space available in small aquariums and minimizes the amount of live rock required to create a particular reef shape. By mounting feet 20 on the top of the posts with ends 21 against a side of the aquarium, an open space can be maintained between the rear of the reef wall and the back of the tank. This open space provides for proper circulation throughout the aquarium and provides easy access for cleaning and maintenance. The open space also provides a space for hiding tank equipment behind the reef.

Figure 2A:
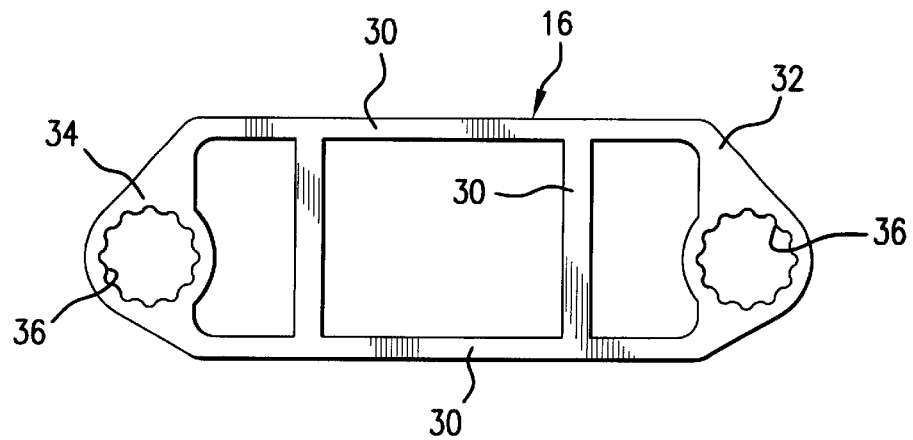
FIG. 2A is a top view of a ledge of the reef rack system in accordance with the present invention.
Figure 2C:
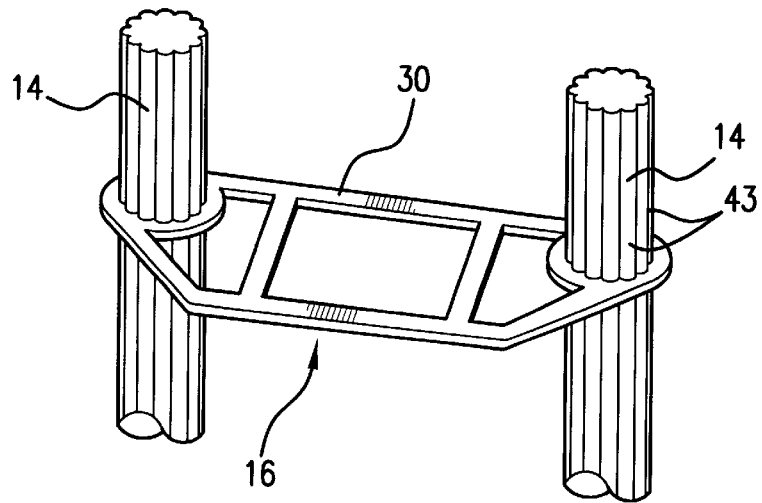
FIG. 2C is a perspective view of the ledge mounted on a pair of posts in accordance with the present invention.

FIG. 2A shows top view of a ledge 16 of the reef rack system 12. The ledge has a frame 30 that can support reef objects such as rock, coral, or other bioscape material and at the same time provides space for circulation within the reef. An attachment frame 32 is attached on one end of frame 30 and a second attachment frame 34 is attached on the second end of frame 30. Each attachment frame has an opening 36 adapted to slide over and removably attach to a post 14. Each post 14 has a plurality of protruding ridges 43, as shown in FIG. 2C, and 44, as shown in FIGS. 3C, 4C, 4E, 4G, and 4H, and 45, as shown in FIGS. 4E, 4G and 4H. The opening 36 is designed to slide over the ridges on the post 14. As seen in FIG. 2A this creates a wavy edge for the opening.

Figure 2B:
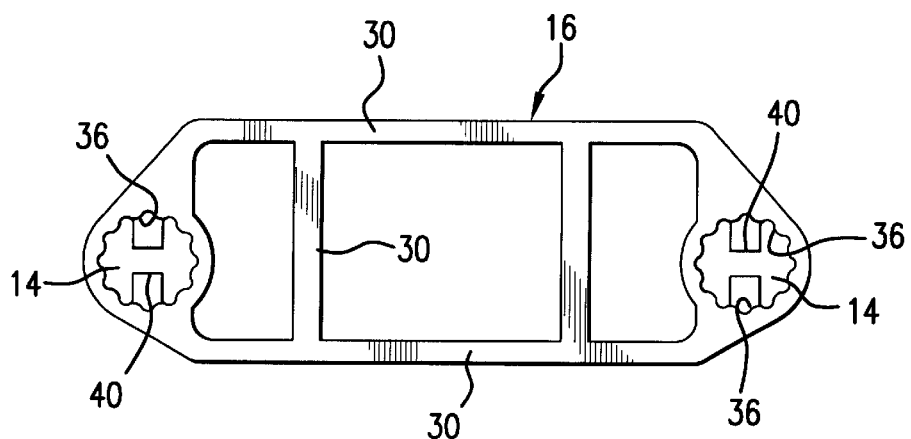
FIG. 2B is a top view of a ledge mounted on a pair of posts of the reef rack system in accordance with the present invention.

A top view of the ledge 16 mounted on a pair of posts 14 is shown in FIG. 2B. As shown the ridges on the post 14 mate with the wavy edge of the opening 36. This creates a tight coupling between the ledge and the post. There is no preferred orientation between a post and the ledge opening, which allows the reef rack system to be configured in many different ways. FIG. 2C is a perspective view of the ledge 16 mounted on a pair of posts 14.

The ledge 16 is made of a flexible material, such as polypropylene or flexible plastic. When the reef materials are placed on the ledge, the weight of the reef materials can slightly flex the ledge, which results in flexing the opening 36 on the attachment frame 32 with respect to the post 14 it is mounted on, which increases the pressure between the attachment frame and the post, locking the ledge in place. The pressure effectively increases the friction between the ledge and the post, eliminating the need for adhesive for locking the ledge in place, while permitting the ledge to be removable.

Figure 3A:
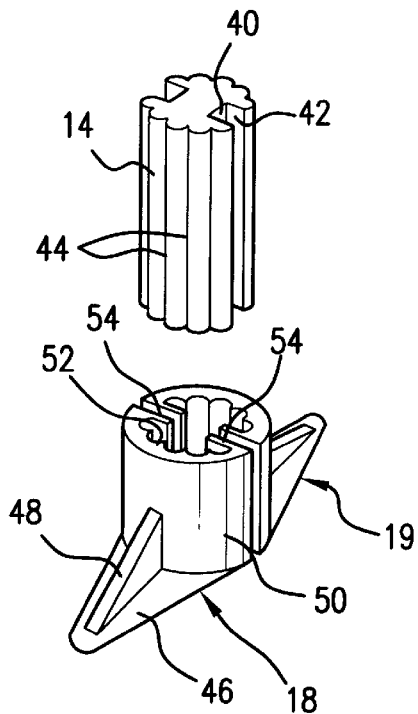
FIG. 3A is a perspective view of a post with two feet about to be installed on the post in accordance with the present invention.

FIG. 3A is a perspective view of a post with two feet about to be installed on the post. Each foot 18 has a base 46 and a foot attachment 50 attached to the base. The foot attachment 50 is adapted to grip the first post between a first portion 52 of the foot attachment 50 that is adapted to mate to the plurality of protruding ridges 44 on a post 14, and first wall portion 54 of the foot attachment that extends into a first channel 40 on the post 14, as shown in FIGS. 3A and 3C, and a second wall portion 54 of the foot attachment that extends into a second channel 41 on the post 14, as shown in FIG. 3C. As shown in FIG. 3A a second foot 19 can also be mounted on the same end of the post in a manner similar to foot 18.

Figure 3B:
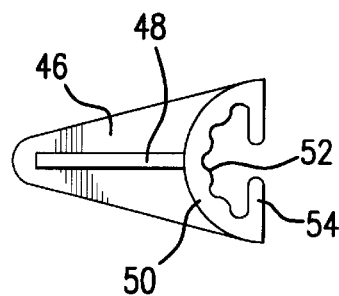
FIG. 3B is a top view of foot in accordance with the present invention.
Figure 3C:
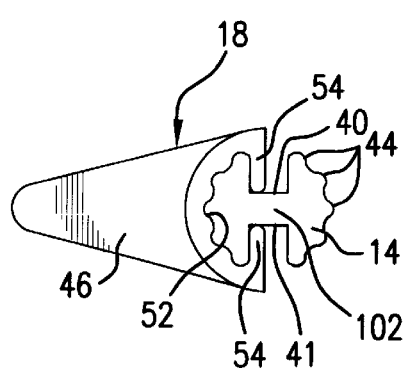
FIG. 3C is a bottom view of a foot mounted on a post in accordance with.the present invention.

The foot 18 or 19, as shown in FIG. 3B has a base 46 and foot attachment 50 as described above. The first portion 52 of the foot attachment 50, that is adapted to mate to the plurality of protruding ridges 44 on a post 14, is shown in FIG. 3B to have a wavy edge similar to the openings 36 on ledge 16. Between the base 46 and foot attachment 50 there is a support 46, which provides support for the foot attachment.

A bottom view of foot 18 mounted on post 14 is shown in FIG. 3C. As shown the ridges 44 on post 14 mate with wavy edge 52 to hold the foot onto the post. Also clear in FIG. 3C is the manner in which first and second wall portions 54 extend into channels 40 and 41 on the post and serve to hold the foot onto the post. The bottom of the post is designated as 102, as shown in FIGS. 3C and 4G.

Figure 3D:
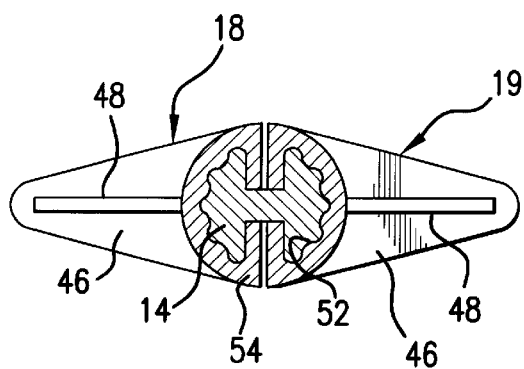
FIG. 3D is a top sectional view of a pair of feet mounted on a post in accordance with the present invention.

A top sectional view of a pair of feet 18 and 19 mounted on post 14 is shown in FIG. 3D. In this view it is shown that the first and second wall portions 54 of each of the feet 18 and 19 extend into channels 40 and 41 on the post. Depending on the layout of the reef a post may have one or two feet mounted on the bottom of the post.

Figure 4A:
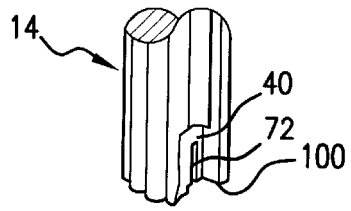
FIGS. 4A, 4B and 4C illustrate a first and second post with a post lock (FIG. 4B) in position to join the first and second post in accordance with the present invention.
Figure 4B:
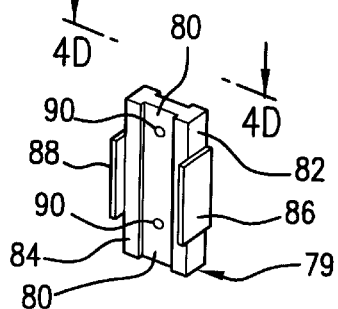
Figure 4E:
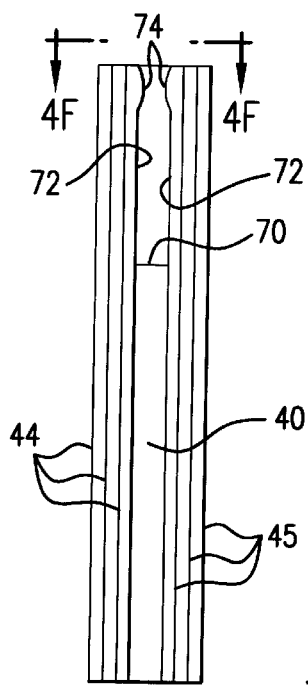
FIG. 4E is a side view of a post showing the configuration of the end of the post for removably joining with a post lock in accordance with the present invention.
Figure 4C:
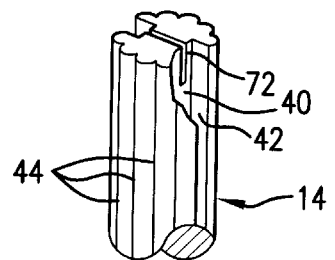

FIGS. 4A, 4B and 4C illustrate a first post (FIG. 4A) and second post 14 (FIG. 4B) with a post lock 79 (FIG. 4B) in position to join the first and second post. The post lock 79 is designed to removably join two posts in order to extend the vertical height of the reef rack system. The post lock 79 has a first rail 82 adapted for sliding into the channels 40 and 40 on the first and second posts. A second rail 84 is adapted for sliding into the channels 41 on the first and second posts. A bar 80 connects and separates the first and second rails. The bar 80 is adapted so that the first and second rails 82 and 84 fit snuggly into the channels 40 and 41 on the first and second posts and so that the bar 80 slides snuggly into notch 72 on the first and second posts. Plates 86 and 88 mounted onto rails 82 and 84, respectively, are adapted to slide over the outside of the ridges 44 and 45 on the first and second posts. FIG. 4D is a top view of the post lock along line 4D—4D of FIG. 4B.

A side view of a post in FIG. 4E shows the configuration of the end of the post 14 for removably joining with a post lock 79. The notch 72 extends through the post to the position 70. At the top of the notch, the notch 72 narrows to form protrusions 74 near the end of post having the notch. These protrusions 74 are designed to mate with indentations 90 placed on the post lock 79, when the post lock is slid onto a post. This further serves to securely hold the post lock onto the post.

Figure 4F:
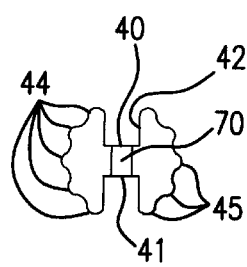
FIG. 4F is a top view of the post along line 4F—4F of FIG. 4E in accordance with the present invention.
Figure 4D:
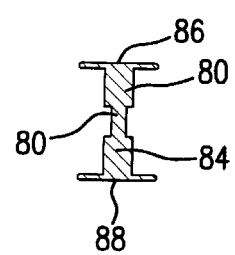
FIG. 4D is a top view of the post lock along line 4D—4D of FIG. 4B in accordance with the present invention.
Figure 4H:
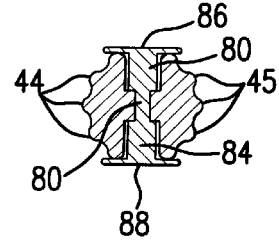
FIG. 4H is a sectional view along line 4H—4H of FIG. 4G in accordance with the present invention.
Figure 4G:
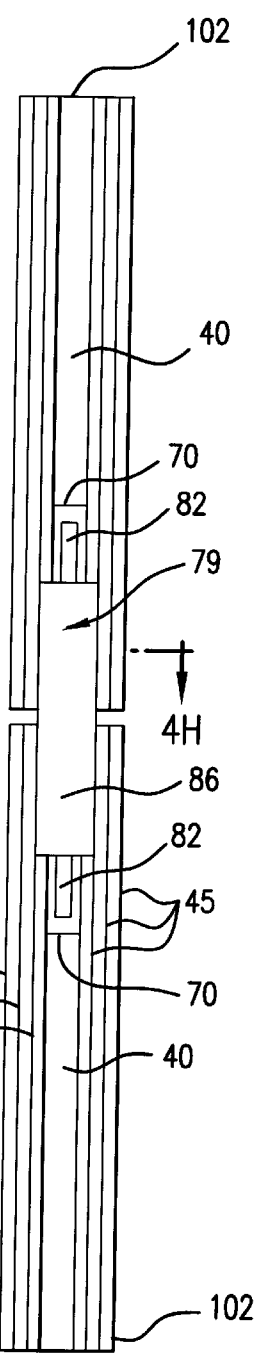
FIG. 4G is a side elevation view of two posts removably joined by a post lock in accordance with the present invention.

Post 14 along line 4F—4F of FIG. 4E, as shown in FIG. 4F, further illustrates the protruding ridges 44 and 45 and the channels 40 and 41 on the post 14. The notch end 70 is also illustrated. FIG. 4G is a side elevation view of two posts removably joined by a post lock 79. FIG. 4H is a sectional view along line 4H—4H of FIG. 4G and shows the post lock rails 82 and 84 and bar 80 in the notch 72.

Figures 5A, 5B, 5C:
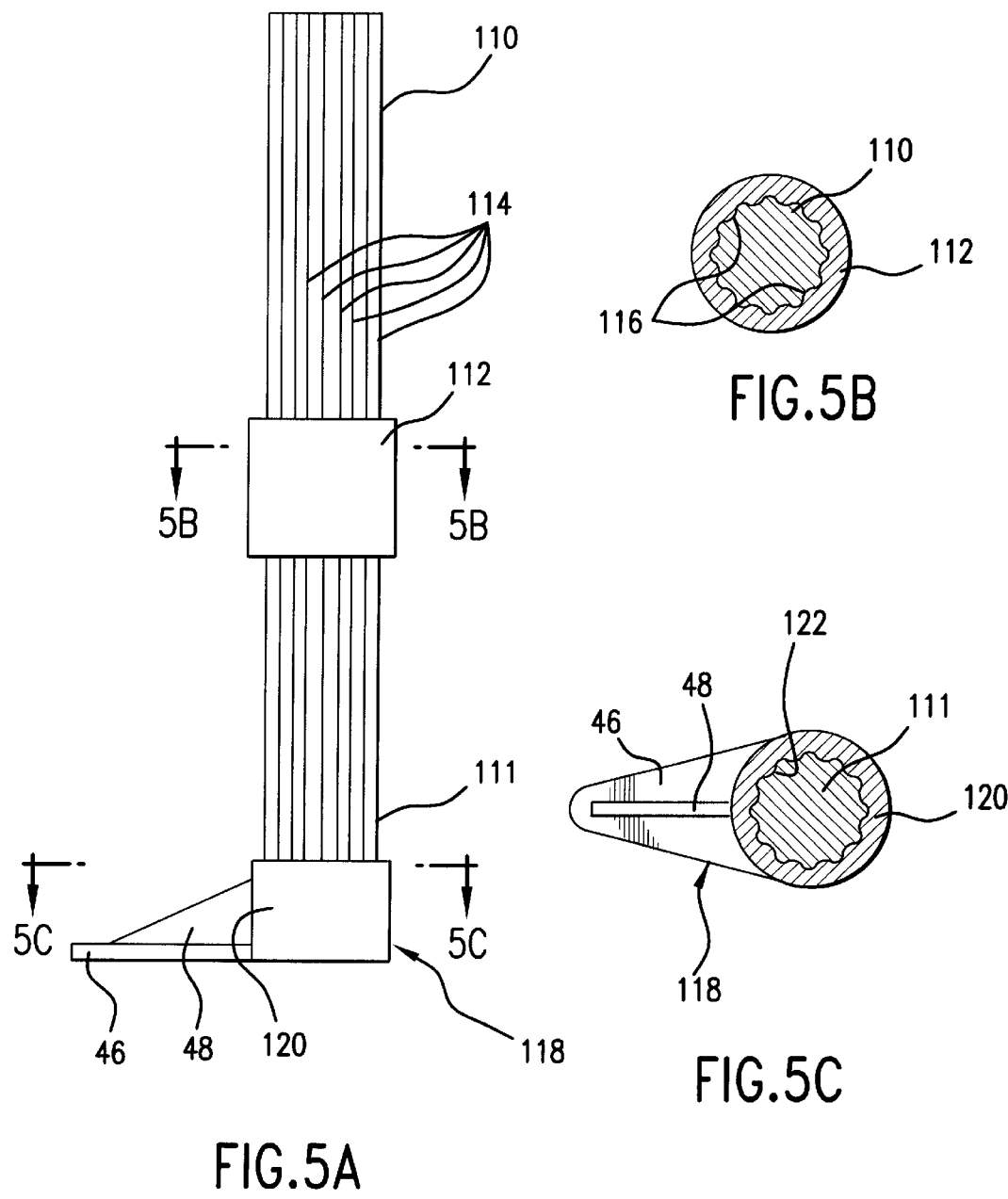
FIG. 5A is a side elevation view of two posts removably joined by a sleeve and also a foot removably mounted on one of the posts in accordance with the present invention.
FIG. 5B is a sectional view of the sleeve mounted on the post along line 5B—5B of FIG. 5A in accordance with the present invention.
FIG. 5C is a top sectional view of the foot mounted on the post along line 5C—5C of FIG. 5A in accordance with the present invention.

FIG. 5A is a side elevation view of two posts 110 and 111 removably joined by a sleeve 112. A sectional view of the sleeve 112 mounted on post 110 along line 5B—5B of FIG. 5A is shown in FIG. 5B. As shown in FIG. 5B the sleeve has an opening with a wavy edge 116 that mates with protruding ridges 114 around the post 110. In this design the post does not have channels or a notch. Rather each post just has protruding ridges along the length of the post. The sleeve 112 is long enough so that a sufficient length of post 110 and 111 can be inserted into the sleeve 112, so that the joined posts are secure and stable.

A foot 118 removably mounted on post 111 is also shown in FIG. 5A. The foot 118 has a base 46, a foot attachment 120, and a support 48 between the base and the foot attachment. FIG. 5C is a top sectional view of the foot mounted on the post along line 5C—5C of FIG. 5A. As shown the foot attachment 120 has an opening with a wavy edge 122 that mates with protruding ridges 114 around the post 111.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A reef rack system for aquariums, the reef rack system comprising:
   a ledge supported by a first removably attached post having a first length and a second removably attached post having a second length;
   the first post comprising:
      a first channel having a first width extending along the first length of the post on a first side of the post and a second channel having the first width extending along the first length of the post on a second side of the post, the second side of the post opposite to the first side of the post; and
      a first plurality of protruding ridges along the first length of the post on a third side of the post between the first and second channels and a second plurality of protruding ridges extending along the first length of the post on a fourth side of the post between the first and second channels, the fourth side of the post opposite to the third side of the post;
   the second post comprising:
      a first channel having the first width extending along the second length of the post on a first side of the post and a second channel having the first width extending along the second length of the post on a second side of the post, the second side of the post opposite to the first side of the post; and
      a first plurality of protruding ridges along the second length of the post on a third side of the post between the first and second channels and a second plurality of protruding ridges extending along the second length of the post on a fourth side of the post between the first and second channels, the fourth side of the post opposite to the third side of the post;

the ledge comprising:
a frame;
a first attachment frame attached to the frame, the first attachment frame having an opening adapted to slide over and removably attach to the first and second plurality of protruding ridges of the first post; and
a second attachment frame attached to the frame, the second attachment frame having an opening adapted to slide over and removably attach to the first and second plurality of protruding ridges of the second post.

2. The reef rack system of claim 1 comprising:
a foot removably attached to said first post, the foot comprising:
a base; and
a foot attachment attached to the base, the foot attachment having a third length normal to the base and adapted to grip the first post between a first portion of the foot attachment that is adapted to mate to the first plurality of protruding ridges, a second portion of the foot attachment that extends into the first channel, and a third portion of the foot attachment that extends into the second channel.

3. The reef rack system of claim 2:
wherein the first portion that extends into the first channel has a second width that is less than half of the first width of the first channel; and
wherein the second portion that extends into the second channel has a second width that is less than half of the first width of the second channel.

4. The reef rack system of claim 3:
wherein a second foot is removably attached to said first post, the second foot comprising:
a base; and
a foot attachment attached to the base, the foot attachment having a third length normal to the base and adapted to grip the first post between a first portion of the foot attachment that is adapted to mate to the second plurality of protruding ridges, a second portion of the foot attachment that extends into the first channel, and a third portion of the foot attachment that extends into the second channel;
wherein the first portion that extends into the first channel has a second width that is less than half of the first width of the first channel; and
wherein the second portion that extends into the second channel has a second width that is less than half of the first width of the second channel.

5. The reef rack system of claim 1 wherein the first post further comprises:
a first end and a second end; and
the second end of the post having a notch cut between the first and second channels, the notch having a fourth length and having a third width narrower than the first width.

6. The reef rack system of claim 5 wherein the reef rack system further comprises:
a third post removably joined to the first post by a post lock;
the third post having a fifth length and comprising:
a first channel having the first width extending along the fifth length of the post on a first side of the post and a second channel having the first width extending along the fifth length of the post on a second side of the post, the second side of the post opposite to the first side of the post;
a first plurality of protruding ridges along the fifth length of the post on a third side of the post between the first and second channels and a second plurality of protruding ridges extending along the fifth length of the post on a fourth side of the post between the first and second channels, the fourth side of the post opposite to the third side of the post;
a first end and a second end; and
the second end of the post having a notch cut between the first and second channels, the notch being the fourth length and having the third width narrower than the first width;
the post lock having a sixth length, the post lock adapted for extending the first length of the first post by removably joining the first post to the third post, the post lock adapted for insertion into the notches on the second ends of the first and third posts, the post lock comprising:
a first rail extending along the sixth length and having a fourth width adapted for sliding between the first width of the first channels on the first and third posts;
a second rail extending along the sixth length and having a fourth width adapted for sliding between the first width of the second channels on the first and third posts; and
a bar connecting and separating the first and second rails, the bar having a fifth width adapted so that the first and second rails fit snuggly into the first and second channels on the first and third posts and the bar having a first depth adapted for sliding snuggly into the third width of the notches on the first and third posts.

7. The reef rack system of claim 6:
wherein the third width of the notches narrows to form protrusions near the second ends of the first and third posts; and
wherein the post lock bar connecting and separating the first and second rails has indentations placed on the bar adapted to mate with the protrusion when said first and third posts are joined with said post lock.

8. The reef rack system of claim 7 wherein the post lock further comprises:
exterior braces for bracing the post lock on at least one of the plurality of protruding ridges on each of the joined first and third posts.

9. A reef rack system for aquariums, the reef rack system comprising:
a ledge supported by a first removably attached post having a first length and first and second ends and a second removably attached post having a second length and first and second ends;
the first post comprising a first plurality of ridges extending along the first length of the first post;
the second post comprising a second plurality of ridges extending along the second length of the second post;
the ledge comprising:
a frame;
a first attachment frame attached to the frame, the first attachment frame having an opening adapted to slide over and removably attach to the first plurality of protruding ridges of the first post; and
a second attachment frame attached to the frame, the second attachment frame having an opening adapted to slide over and removably attach to the second plurality of protruding ridges of the second post.

10. The reef rack system of claim 9 comprising:
a foot removably attached to the first end of said first post, the foot comprising:
   a base; and
   a foot attachment attached to the base, the foot attachment having a third length normal to the base and having an opening adapted to slide over and removably attach to the first plurality of protruding ridges of the first post.

11. The reef rack system of claim 10:
a foot removably attached to the first end of said second post, the foot comprising:
   a base; and
   a foot attachment attached to the base, the foot attachment having the third length normal to the base and having an opening adapted to slide over and removably attach to the second plurality of protruding ridges of the second post.

12. The reef rack system of claim 11 further comprising:
a third post removably joined to the first post by a post sleeve;
the third post having a fourth length and first and second ends and comprising a third plurality of ridges extending along the fourth length of the third post;
the post sleeve having a fifth length, the post sleeve adapted for extending the first length of the first post by removably joining the first post to the third post, the post sleeve comprising:
   a cylinder having interior walls adapted to slide over and removably attach to the first plurality of protruding ridges of the first post and the third plurality of protruding ridges of the third post.

13. A reef rack system for aquariums, the reef rack system comprising:
a first and second ledge partially supported by a first removably attached post having a first length;
the first post comprising:
   a first channel having a first width extending along the first length of the post on a first side of the post and a second channel having the first width extending along the first length of the post on a second side of the post, the second side of the post opposite to the first side of the post; and
   a first plurality of protruding ridges along the first length of the post on a third side of the post between the first and second channels and a second plurality of protruding ridges extending along the first length of the post on a fourth side of the post between the first and second channels, the fourth side of the post opposite to the third side of the post;
the first and second ledges comprising:
   a frame; and
   a first attachment frame attached to the frame, the first attachment frame having an opening adapted to slide over and removably attach to the first and second plurality of protruding ridges of the first post;
wherein the first ledge is removably attached at a second length from first end of the first post; and
wherein the second ledge is removably attached at a third length from first end of the first post.

14. The reef rack system of claim 13 comprising:
a foot removably attached to said first post, the foot comprising:
   a base; and
   a foot attachment attached to the base, the foot attachment having a fourth length normal to the base and adapted to grip the first post between a first portion of the foot attachment that is adapted to mate to the first plurality of protruding ridges, a second portion of the foot attachment that extends into the first channel, and a third portion of the foot attachment that extends into the second channel.

15. The reef rack system of claim 14:
wherein the first portion that extends into the first channel has a second width that is less than half of the first width of the first channel; and
wherein the second portion that extends into the second channel has a second width that is less than half of the first width of the second channel.

16. The reef rack system of claim 15:
wherein a second foot is removably attached to said first post, the second foot comprising:
   a base; and
   a foot attachment attached to the base, the foot attachment having a fourth length normal to the base and adapted to grip the first post between a first portion of the foot attachment that is adapted to mate to the second plurality of protruding ridges, a second portion of the foot attachment that extends into the first channel, and a third portion of the foot attachment that extends into the second channel;
wherein the first portion that extends into the first channel has a second width that is less than half of the first width of the first channel; and
wherein the second portion that extends into the second channel has a second width that is less than half of the first width of the second channel.

17. A reef rack system for aquariums, the reef rack system comprising:
a plurality of posts each post having a first and second end and each post having a plurality of protruding ridges along a length of the post;
a plurality of ledges, each ledge comprising:
   a frame having a first opening; and
   first and second integral attachment frames at opposite ends of the ledge, the first and second attachment frames each having a second opening and each said second opening in said attachment frames removably attached and slid over the plurality of protruding ridges on one of said plurality of posts;
wherein at least two of said plurality of ledges are removably attached to at least one of said plurality of posts.

18. The reef rack system for aquariums of claim 17 comprising at least one foot slid over and removably attached to the first end of one of said plurality of posts.

19. The reef rack system for aquariums of claim 18 comprising at least one foot slid over and removably attached to the second end of one of said plurality of posts.

20. The reef rack system for aquariums of claim 17 wherein the first end of one of said plurality of posts is removably coupled to the second end of another of said plurality of posts to provide a longer coupled post.

* * * * *